United States Patent [19]
Ose

[11] Patent Number: 5,128,093
[45] Date of Patent: Jul. 7, 1992

[54] CONTROL ROD DRIVE HYDRAULIC SYSTEM

[75] Inventor: Richard A. Ose, San Jose, Calif.

[73] Assignee: General Electric Company, San Jose, Calif.

[21] Appl. No.: 678,567

[22] Filed: Mar. 27, 1991

[51] Int. Cl.$^5$ ............................................... G21C 7/16
[52] U.S. Cl. ...................................... 376/219; 376/230
[58] Field of Search .................... 376/230, 231, 219; 976/DIG. 127

[56] References Cited

U.S. PATENT DOCUMENTS

| | | | |
|---|---|---|---|
| 3,347,748 | 10/1967 | Olsson | 376/230 |
| 3,843,471 | 10/1974 | Bevilacqua | 376/230 |

OTHER PUBLICATIONS

Wilkins et al, Advanced BWR: Design Improvements Build on Proven Technology Nuclear Engineering International, reprint Jun. 1986, pp. 1-7 and drawing entitled "The World's Reactors No. 89".

General Electric Company (GE), BWR/6 Operating Fundamentals, "The Control Rod and Control Rod Drive Mechanism," pp. 1-11, Table 1, FIGS. 1-4; Control Rod Drive Hydraulic System, pp. 1-9, and FIGS. 1-3, undated, provided to GE Customers more than one year ago.

General Electric Company (GE) "ABWR Standard Plant", GE Document 23A6100AB, pp. 4.6-6.1;4.6-7 to 4.6-10; 4.6-24 4.6-25 and 4.6-26 submitted to U.S. Nuclear Regulatory Commission in General Electric Company Advanced Boiling Water Reactor Standard Safety Analysis Report, Docket No. 50-605, dated Sep. 29, 1987.

Primary Examiner—Brooks H. Hunt
Assistant Examiner—Frederick H. Voss
Attorney, Agent, or Firm—Robert R. Schroeder

[57] ABSTRACT

A hydraulic system for a control rod drive (CRD) includes a variable output-pressure CR pump operable in a charging mode for providing pressurized fluid at a charging pressure, and in a normal mode for providing the pressurized fluid at a purge pressure, less than the charging pressure. Charging and purge lines are disposed in parallel flow between the CRD pump and the CRD. A hydraulic control unit is disposed in flow communication in the charging line and includes a scram accumulator. An isolation valve is provided in the charging line between the CRD pump and the scram accumulator. A controller is operatively connected to the CRD pump and the isolation valve and is effective for opening the isolation valve and operating the CRD pump in a charging mode for charging the scram accumulator, and closing the isolation valve and operating the CRD pump in a normal mode for providing to the CRD through the purge line the pressurized fluid at a purge pressure lower than the charging pressure.

7 Claims, 1 Drawing Sheet

CONTROL ROD DRIVE HYDRAULIC SYSTEM

The Government has rights in this invention in accordance with Contract No. DE-AC03-90SF18494 awarded by the Department of Energy.

TECHNICAL FIELD

The present invention relates generally to nuclear reactors, and, more specifically, to a hydraulic system for providing pressurized fluid to control rod drives thereof.

BACKGROUND ART

A conventional boiling water reactor includes a plurality of control rod drives (CRDs) which are effective for selectively inserting and withdrawing control rods into and from the core of the reactor. In one embodiment, the CRDs include a piston against which is provided a pressurized hydraulic fluid, such as water, for providing the force for inserting the control rods during a scram operation. The pressurized fluid is provided to the CRDs by conventional hydraulic control units (HCUs) for selectively controlling the operation of the CRDs.

In order to ensure effective reactor shutdown during scram, the HCUs include conventional scram accumulators which are connected to a common charging water header and are charged with the pressurized fluid for storing the pressurized fluid for use in the scram operation. The charging water header is connected to a relatively high power, for example about 500 shaft horsepower, CRD pump which is run continuously at a high speed sufficient to generate a discharge pressure great enough to maintain the scram accumulators continuously charged to a pressure sufficient to scram the control rods at their required speeds.

During normal plant operation, when the scram accumulators are full, there is no flow through the charging water header. However, the CRD pump discharge pressure must remain high enough to maintain the charging header at a pressure sufficient to keep the scram accumulators fully pressurized. This discharge pressure is significantly higher than that required for the CRD pump to perform its other normal operating function of delivering purge water on a continuous basis to a conventional fine motion control rod drive (FMCRD) found in the CRD. The purge water is provided from the CRD pump to the respective CRDs through a purge water header that is arranged in parallel with the charging water header.

Thus, a significant economic penalty is incurred in this design by having to provide electric power to drive the high power CRD pump continuously at a speed and discharge pressure greater than those required for delivering the normal purge water flow to the CRDs.

OBJECT OF THE INVENTION

Accordingly, one object of the present invention is to provide a new and improved control rod drive hydraulic system in which the CRD pump may be operated for a substantial amount of time at a relatively low speed and low discharge pressure while maintaining the scram accumulators at an acceptable pressure.

DISCLOSURE OF INVENTION

A hydraulic system for a control rod drive (CRD) includes a variable output-pressure CRD pump operable in a charging mode for providing pressurized fluid at a charging pressure, and in a normal mode for providing the pressurized fluid at a purge pressure, less than the charging pressure. Charging and purge lines are disposed in parallel flow between the CRD pump and the CRD. A hydraulic control unit is disposed in flow communication in the charging line and includes a scram accumulator. An isolation valve is provided in the charging line between the CRD pump and the scram accumulator. Control means are operatively connected to the CRD pump and the isolation valve and are effective for opening the isolation valve and operating the CRD pump in a charging mode for providing the pressurized fluid at the charging pressure through the charging line to charge the scram accumulator, and closing the isolation valve and operating the CRD pump in a normal mode for providing to the CRD through the purge line the pressurized fluid at a purge pressure lower than the charging pressure.

BRIEF DESCRIPTION OF DRAWINGS

The novel features characteristic of the invention are set forth and differentiated in the claims. The invention, in accordance with preferred and exemplary embodiments, together with further objects and advantages thereof, is more particularly described in the following detailed description taken in conjunction with the accompanying drawing in which:

MODE(S) FOR CARRYING OUT THE INVENTION

Figures 1, 2:
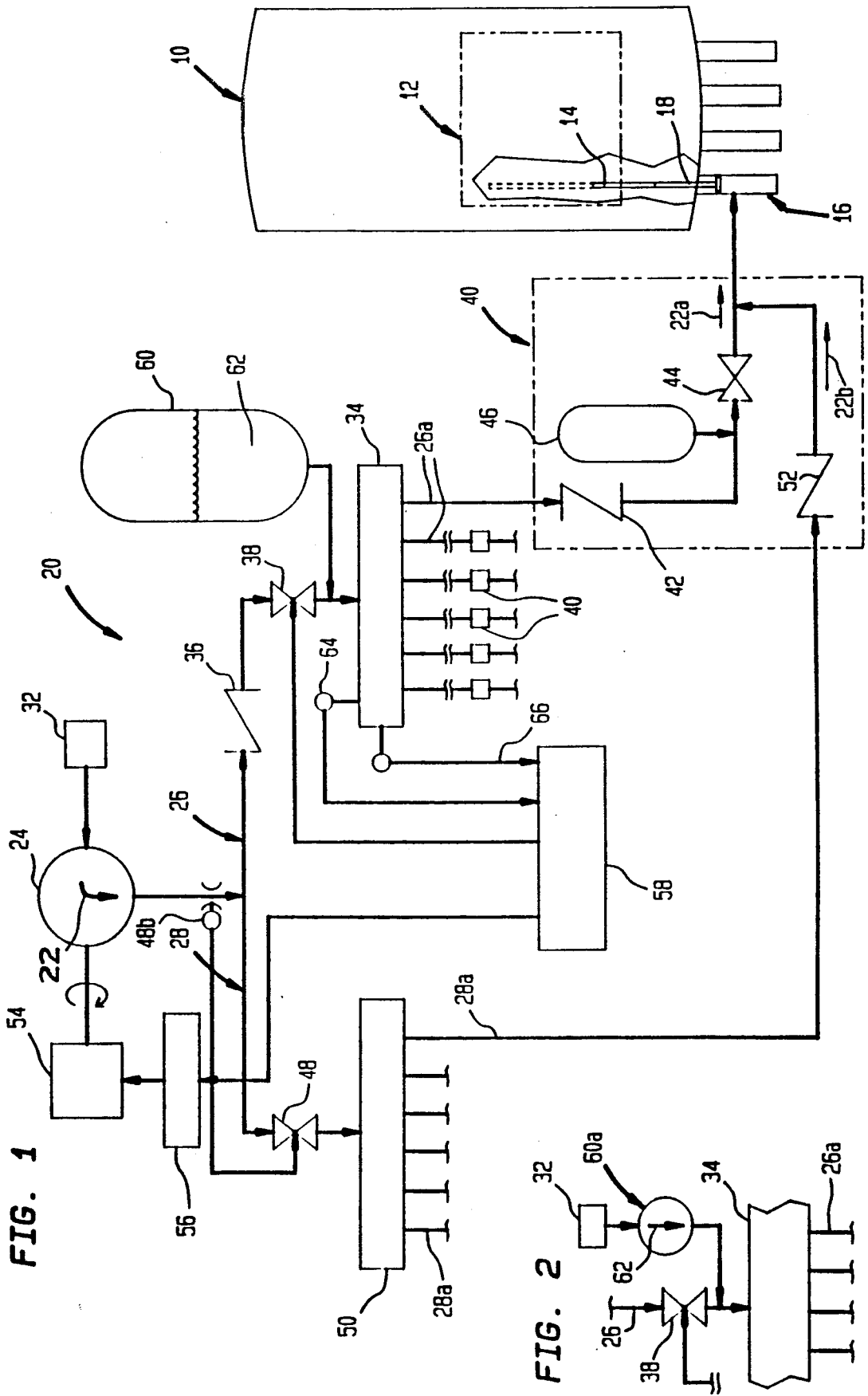
FIG. 1 is a schematic representation of a hydraulic system for, control rod drives of a nuclear reactor.
FIG. 2 is a schematic view of a portion of the CRD hydraulic system illustrated in Figure showing an alternate embodiment of a pressurizing means.

Illustrated in FIG. 1 is an exemplary boiling water nuclear reactor 10 having a reactor core 12 in which are disposed a plurality of conventional control rods 14, only one of which is illustrated. Each of the control rods 14 is selectively inserted into the core 12 and withdrawn from the core 12 by a conventional control rod drive (CRD) 16, with a plurality of CRDs 16 being provided for moving a respective plurality of control rods 14.

Each of the CRDs 16 in this exemplary embodiment includes a conventional output shaft and piston 18 provided for quickly inserting the control rod 14 into the core 12 during a scram operation. More specifically, a hydraulic control system 20 in accordance with one embodiment of the invention is provided for the CRDs 16 to selectively deliver a scram fluid 22a at a relatively high scram pressure $P_s$ to the CRDs 16 during a scram operation for lifting the shaft and piston 18 to insert the control rod 14 into the core 12. During normal operation of the reactor 10, a purge fluid 22b at a relatively low purge pressure $P_p$ is continuously provided to the CRDs 16, for example to a conventional fine motion control rod drive (not shown) contained in each of the CRDs. 16. The purge fluid 22b is conventionally discharged from the CRDs 16 into the reactor 10 having a reactor vessel internal pressure $P_r$ of about 73 kg/cm$^2$g in one embodiment. The purge fluid pressure $P_p$ is suitably greater than the reactor pressure $P_r$, and may be, for example, about 80 kg/cm$^2$g to ensure its flow into the reactor 10 through the CRDs 16. And, the scram fluid pressure $P_s$ is at least about 130 kg/cm$^2$g in this exemplary embodiment.

The scram and purge fluids 22a and 22b are provided from a common, conventional control rod drive (CRD) pump 24 through parallel charging and purge lines, or conduits, 26 and 28, respectively, disposed in flow communication between the CRD pump 24 and each of the CRDs 16. The CRD pump 24 is operable at a relatively high speed for providing a pressurized fluid 22 at a relatively high charging pressure $P_c$ for example, about 156 kg/cm²g, with the pressurized fluid 22 being water, such as demineralized water provided from a conventional reservoir 32. The pressurized water 22 is discharged from the CRD pump 24 with a first portion thereof being channeled through the charging line 26 as the scram fluid or water 22a, and a second portion thereof being channeled through the purge line 28 as the purge fluid or water 22b.

The charging line 26 includes in series flow communication from the CRD pump 24 to a conventional charging water header 34, a conventional check valve 36 and a conventional isolation valve 38. The check valve 36 is effective for checking, or preventing, backflow of the scram water 22a upstream in the charging line 26, and the isolation valve 38 is preferably normally closed for preventing flow of the scram water 22a into the header 34 or out of the header 34 by backflow through the isolation valve 38, which is also operable in an open position for allowing unrestricted flow of the scram water 22a into the header 34. The header 34 is disposed downstream of the isolation valve 38, and the charging line 26 includes a plurality of branches 26a extending downstream from the header 34 and disposed in parallel flow communication between the header 34 and respective ones of the CRDs 16. A plurality of conventional hydraulic control units (HCUs) 40 are disposed in parallel flow communication between the header 34 and respective ones of the CRDs 16, with each of the HCUs 40 being disposed in series flow communication in a respective one of the charging line branches 26a.

Each of the HCUs 40 includes in series flow in the charging line 26, i.e. respective charging line branch 26a, an HCU check valve 42 and a preferably normally closed scram valve 44. The HCU 40 also includes a conventional scram accumulator 46 disposed in flow communication in the charging line 26 between the check valve 42 and the scram valve 44 for accumulating the scram water 22a at the charging pressure $P_c$, with the check valve 42 being effective for checking backflow of the scram water 22a upstream toward the isolation valve 38.

The purge line 28 includes a conventional, selectively operable flow control valve 48 in flow communication with the CRD pump 24 and a conventional purge water header 50 disposed in flow communication downstream therefrom. The purge line 28 also includes a plurality of branches 28a disposed in parallel flow communication between the purge water header 50 and respective ones of the CRDs 16 for channeling the purge water 22b thereto. Each of the purge line branches 28a preferably includes a conventional check valve 52 which checks, or prevents, backflow of the purge water 22b upstream in the branch 28a, and forms a component of the HCU 40.

In a conventional hydraulic system for providing the pressurized water 20 to the CRDs 16, the CRD pump 24 is conventionally run continuously at its high speed to provide the pressurized water 20 at the relatively high charging pressure $P_c$ of about 156 kg/cm²g which flows through the charging lines 26 to continuously charge the scram accumulators 46. The CRD pump 24 is operatively connected to a conventional electrical motor 54, which in one embodiment is a relatively high power motor effective for providing about 500 shaft horsepower for powering the CRD pump 24 for maintaining the charging pressure $P_c$ and for providing a maximum volume flow rate of about 506 l/min, for example. However, the charging pressure $P_c$, e.g. 156 kg/cm²g, is substantially greater than the purge pressure $P_p$, e.g. 80 kg/cm²g, required of the purge water 22b in the purge line 28, which flows at a reduced volume flow rate of about 267 l/min.

Accordingly, in order to reduce the amount of electrical power required of the motor 54 for running the CRD pump 24 during normal operation of the reactor 10, and reduce operating costs, the hydraulic control system 20 in accordance with one embodiment of the present invention includes a conventional adjustable speed drive (ASD) 56 operatively connected to the motor 54 and a conventional control means, or controller 58. The ASD 56 is effective for controlling the speed of the motor 54 and the CRD pump 24 joined thereto so that the CRD pump 24 may operate as a variable output-pressure pump. Upon command from the controller 58, the ASD 56 is effective for operating the motor 54 and the CRD pump 24 at a first, relatively low, speed in a normal mode of operation for obtaining from the CRD pump 24 the pressurized water 22 at the relatively low purge pressure $P_p$, which is channeled through the purge lines 28 as the purge water 22b to the CRDs 16. The ASD 56 is also responsive to the controller 58 for operating the motor 54 and the CRD pump 24 at its high, second speed, greater than the first speed, in a charging mode of operation for discharging from the CRD pump 24 the pressurized water 22 at the charging pressure $P_c$ which is channeled through the charging lines 26 to charge the scram accumulators 46.

In this way, the CRD pump 24 may be more economically run for a substantial amount of time in the low speed, low pressure, normal mode for providing the pressurized fluid 22 at only the relatively low purge pressure $P_p$ which is channeled through the purge lines 28. The flow control valve 48 in the purge line 28 upstream of the purge water header 50 may control flow of the purge water 22b therethrough without appreciable pressure reduction in the normal mode.

Although the HCU check valve 42 in each of the charging line branches 26a checks backflow of the scram water 22a therethrough, over time the scram water 22a will leak from the charging line 26, through the HCU check valve 42 for example, thusly reducing the pressure of the scram water 22a contained in the scram accumulator 46. When the pressure in the scram accumulator 46 decreases to a predetermined minimum scram pressure $P_m$, the controller 58 signals the ASD 56 to operate the motor 54 and the CRD pump 24 at the high speed for recharging the HCU accumulators 46.

The isolation valve 38 in a conventional hydraulic system would be normally open to allow flow of the scram water 22a to continuously charge the scram accumulators 46. However, in a preferred embodiment of the present invention, the isolation valve 38 is normally closed in the normal mode of operation for reducing leakage of the scram water 22a upstream in the charging line 26 from the HCU check valve 42 for delaying the leaking discharge of the scram accumulators 46 and delaying the need for operating the CRD pump 24 at its high speed.

In order to further delay the need for recharging the scram accumulators 46, pressurizing means 60 in the exemplary form of a conventional accumulator are disposed in flow communication with the charging line 26 downstream of the isolation valve 38 and upstream of the scram valve 44, and preferably upstream of the charging water header 34 for providing pressurized makeup water 62. The makeup accumulator 60 is sized for maintaining the scram water 22a at a scram pressure $P_s$ which is greater than the minimum scram pressure $P_m$, for example about 130 kg/cm²g, and up to the charging pressure $P_c$, e.g. 156 kg/cm²g, when the CRD pump 24 is in the normal mode, or operating at low speed. Since the scram accumulators 46 are relatively low volume and since the charging line 26 including its branches 26a also are relatively low volume conduits, relatively little leakage of the scram water 22a therefrom will relatively quickly decrease the pressure inside the scram accumulators 46.

Accordingly, the makeup accumulator 60 is predeterminedly sized for accumulating a portion of the scram water 22a as the makeup water 62 at the charging pressure $P_c$ in the charging mode, which makeup water 62 is then channeled back into the charging line 26 during the normal mode to offset leakage of the scram water 22a from the charging line 26 which decreases the pressure therein.

More specifically, in the charging mode, the controller 58 is effective for opening the isolation valve 38 while the scram valves 44 are closed and operating the CRD pump 24 in the charging mode for providing into the charging line 26 the pressurized water 22 at the charging pressure $P_c$ to charge both the makeup accumulator 60 through the open isolation valve 38 and the scram accumulators 46 through the HCU check valves 42. The purge water 22b is also channeled from the CRD pump 24 and through the purge line 28 to the CRDs 16. The flow control valve 48 is suitably partially closed in response to a conventional system flow meter 48b for dropping the pressure across the flow control valve 48 from the charging pressure $P_c$ to the purge pressure $P_p$.

When the scram accumulators 46 and the makeup accumulator 60 are fully charged to the charging pressure in the charging mode, the controller 58 is effective for closing the isolation valve 38 while the scram valves 44 remain closed and operating the CRD pump 24 in the normal, reduced speed and pressure, mode for providing into the purge line 28 the pressurized water 22 at the reduced purge pressure $P_p$. In the normal mode, the flow control valve 48 is near fully opened in response to the flow meter 48b for providing a minimum pressure drop thereacross.

In the event of a scram mode of operation, the scram valves 44 are opened in response to signals from their conventional control system to allow the scram water 22a stored in the scram accumulators 46 to enter the respective CRDs 16 for fully inserting the control rods 14 into the core 12.

In order to appropriately operate the control system 20 in the charging mode and in the normal mode, a conventional pressure sensor 64 is operatively connected to the charging line 26, preferably at the charging water header 34, and to the controller 58, and is responsive to the scram pressure $P_s$ of the scram water 22a in the header 34. When the controller 58 senses through the pressure sensor 64 that the scram pressure $P_s$ in the header 34 drops to the minimum scram pressure $P_m$, the system 20 is operated in the charging mode for recharging the makeup accumulator 60 and the scram accumulators 46. When the controller 58 through the pressure sensor 64 determines that the scram pressure $P_s$ in the header 34 is substantially equal to the charging pressure $P_c$, the system 20 is returned from the charging mode and to the normal mode.

The pressure sensor 64 may be in the form of conventional pressure switches which are configured for suitably opening and closing at the minimum scram pressure $P_m$ and the charging pressure $P_c$ for correspondingly providing signals to the controller 58 for operating the system 20 in either of the normal mode or the charging mode. Alternatively, the pressure of the scram water 22a in the header 34 may be obtained through a conventional rod control and information system (RCIS) indicated schematically at 66 which provides low pressure setpoint signals used for blocking withdrawal movement of the control rod 14 when the pressure in the charging water header 34 is relatively low, at which low pressure, scram insertion of the control rod 14 is conventionally effected. The minimum scram pressure $P_m$ is preferably larger than the low pressure scram setpoint to allow the system 20 to charge the accumulators 60 and 46 without prematurely effecting scram.

An exemplary minimum scram pressure $P_m$ is about 130 kg/cm²g which is less than the charging pressure $P_c$ of about 156 kg/cm²g for the exemplary CRD pump 24. Accordingly, the difference between these two pressures represents an acceptable pressure range for the scram pressure $P_s$ during which the system 20 may be operated in the normal mode. As described above, the makeup accumulator 60 may be suitably sized for delaying the drop of the scram pressure $P_s$ within this range to the minimum scram pressure $P_m$ which, y embodiment, may be about a week. Accordingly, the system 20 may be operated in the normal mode for about a week at a time, thusly reducing the expenditure of energy which would otherwise be required by operating the CRD pump 24 at its maximum speed and charging pressure $P_c$ in the charging mode, which reduces cost. The charging mode, accordingly, would occur about weekly for relatively short time periods to recharge the accumulators 60 and 46. Furthermore, continuous operation of the motor 54 and the CRD pump 54 at the reduced speed during the normal mode will produce less wear thereon, and therefore, reduced maintenance costs therefor.

Upon initial startup of the reactor 10, the CRD pump 24 would be run at its high speed with the isolation valve 38 open to allow charging of the accumulators 60 and 46. When they are fully charged, the isolation valve 38 may be closed and the speed of the CRD pump 24 reduced to its long term operating speed in the normal mode. During subsequent operation, recharging of the accumulators 60 and 46 will occur automatically by the controller 58, or, the operator of the reactor 10 may monitor the pressure from the pressure sensor 64 to manually signal opening of the isolation valve 38 and increasing the speed of the CRD pump 24 in the charging mode for recharging the accumulators.

Illustrated in FIG. 2 is an alternate embodiment of the pressurizing means 60 in the form of a conventional high pressure, low volume makeup pump 60a. The makeup pump 60a is conventionally operatively connected to the reservoir 32 for providing the makeup water 62 from the reservoir 32 into the charging line 26 during the normal mode to offset leakage of the scram water 22a therefrom. The makeup pump 60a may be predeterminedly sized substantially smaller than the CRD pump 24, for example having a driving motor thereof producing about 10 shaft horsepower. The makeup pump 60a is effective for providing the makeup water 62 into the charging line 26 downstream of the isolation valve 38 and upstream of the scram valves 44 into the header 34 at a relatively high pressure such as the charging pressure $P_c$ for offsetting leakage of the scram water 22a from the charging line 26 which would reduce the pressure in the scram accumulators 46. The size of the makeup pump 60a may be selected for matching the actual leakage from the charging line 26 to prevent the reduction of pressure of the charged accumulators 46. However, it is desirable to have a makeup pump 60a as small as possible for reducing the consumption of power for reducing costs. The makeup pump 60a will preferably operate continuously, and will be sized to allow the CRD pump 24 to run at its reduced speed mode for all normal operating conditions. Preferably, the CRD pump 24 would only have to be run at its high speed mode following a scram in order to recharge the accumulators 46. In either embodiment of the invention, an overall reduction in power consumption is obtained by operating the CRD pump 24 intermittently at its high speed and high discharge charging pressure $P_c$.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A hydraulic system for a control rod drive (CRD) comprising:
    a variable output-pressure CRD pump operable in a charging mode for providing a pressurized fluid at a charging pressure, and in a normal mode for providing said pressurized fluid at a purge pressure being lower than said charging pressure;
    a charging line disposed in flow communication between said CRD pump and said CRD for channeling therethrough a first portion of said pressurized fluid as scram fluid, said charging line including an isolation valve;
    a purge line disposed in flow communication between said CRD pump and said CRD, and in parallel flow with said charging line, for channeling therethrough a second portion of said pressurized fluid as purge fluid;
    a hydraulic control unit (HCU) disposed in flow communication in said charging line between said isolation valve and said CRD and including in series flow in said charging line an HCU check valve and a normally closed scram valve, and a scram accumulator disposed therebetween for accumulating said scram fluid at said charging pressure during said charging mode, said HCU check valve being effective for checking backflow of said scram fluid upstream toward said isolation valve;
    pressurizing means disposed in flow communication with said charging line downstream of said isolation valve and upstream of said scram valve for maintaining said scram fluid at a scram pressure greater than a predetermined minimum scram pressure between said purge pressure and said charging pressure when said CRD pump is in said normal mode;
    a pressure sensor operatively connected to said charging line and responsive to said scram pressure;
    control means operatively connected to said CRD pump, said isolation valve, and said pressure sensor, and being effective for:
        opening said isolation valve while said scram valve is closed when said scram pressure drops to said minimum scram pressure, and operating said CRD pump in said charging mode for providing into said charging line said pressurized fluid at said charging pressure to charge said scram fluid through said HCU check valve and into said scram accumulator to said charging pressure; and
        closing said isolation valve while said scram valve is closed when said scram fluid in said charging line and in said scram accumulator reaches said charging pressure, and operating said CRD pump in said normal mode for providing into said purge line said pressurized fluid at said purge pressure.

2. A CRD hydraulic system according to claim 1 wherein said pressurizing means include a pressurizing pump having a smaller power requirement than said CRD pump and effective for channeling into said charging line during said normal mode makeup fluid to offset leakage of said scram fluid from said charging line.

3. A CRD hydraulic system according to claim 1 wherein said pressuring means include a makeup accumulator for accumulating a portion of said scram fluid as makeup fluid at said charging pressure in said charging mode, and in said normal mode channeling back into said charging line said makeup fluid to offset leakage of said scram fluid from said charging line for maintaining said scram fluid at least at said minimum scram pressure.

4. A CRD hydraulic system according to claim 3 further including:
    a motor operatively connected to said CRD pump;
    an adjustable speed drive operatively connected to said motor and said control means; and
    said adjustable speed drive being effective for operating said CRD pump at a first speed for obtaining said purge pressure in said normal mode, and at a second speed, greater than said first speed, for obtaining said charging pressure in said charging mode.

5. A CRD hydraulic system according to claim 4 further including:
    a plurality of said CRDs;
    said charging line including a charging fluid header disposed downstream from said isolation valve for receiving said scram fluid therefrom;
    said purge line including a purge fluid header disposed downstream from said CRD pump, and a plurality of branches disposed in parallel flow communication between said purge fluid header and respective ones of said CRDs for channeling said purge fluid thereto; and
    a plurality of said HCUs disposed in parallel flow communication between said charging fluid header and respective ones of said CRDs.

6. A method of providing a pressurized fluid to a control rod drive (CRD) in a hydraulic system including:
- a variable output-pressure CRD pump operable in a charging mode for providing said pressurized fluid at a charging pressure, and in a normal mode for providing said pressurized fluid at a purge pressure being lower than said charging pressure;
- a charging line disposed in flow communication between said CRD pump and said CRD for channeling therethrough a first portion of said pressurized fluid as scram fluid, said charging line including an isolation valve;
- a purge line disposed in flow communication between said CRD pump and said CRD, and in parallel flow with said charging line, for channeling therethrough a second portion of said pressurized fluid as purge fluid;
- a hydraulic control unit (HCU) disposed in flow communication in said charging line between said isolation valve and said CRD and including in series flow in said charging line an HCU check valve and a normally closed scram valve, and a scram accumulator disposed therebetween for accumulating said scram fluid at said charging pressure during said charging mode, said HCU check valve being effective for checking backflow of said scram fluid upstream toward said isolation valve;

said method comprising the steps of:
in said normal mode:
- operating said CRD pump for providing said pressurized fluid at said purge pressure while said isolation and scram valves are closed;
- channeling said purge fluid to said CRD; and
- channeling into said charging line downstream of said isolation valve and upstream of said scram valve a makeup fluid to offset leakage of said scram fluid from said charging line for maintaining said scram fluid at a scram pressure greater than a predetermined minimum scram pressure between said purge pressure and said charging pressure; and in said charging mode:
- opening said isolation valve while said scram valve is closed when said scram pressure drops to said minimum scram pressure;
- operating said CRD pump for providing into said charging line said pressurized fluid at said charging pressure to charge said scram fluid through said HCU check valve and into said scram accumulator to said charging pressure; and
- closing said isolation valve while said scram valve is closed when said scram fluid in said charging line and in said scram accumulator reaches said charging pressure.

7. A method according to claim 6 further including the step of opening said scram valve in a scram mode to allow said scram fluid stored in said scram accumulator to enter said CRD.

* * * * *